(12) United States Patent  (10) Patent No.: US 8,532,344 B2
Connell et al.  (45) Date of Patent: Sep. 10, 2013

(54) METHODS AND APPARATUS FOR GENERATION OF CANCELABLE FACE TEMPLATE

(75) Inventors: Jonathan Hudson Connell, Cortlandt Manor, NY (US); Nalini Kanta Ratha, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1646 days.

(21) Appl. No.: 11/971,643

(22) Filed: Jan. 9, 2008

(65) Prior Publication Data

US 2009/0175508 A1  Jul. 9, 2009

(51) Int. Cl.
*G06K 9/00* (2006.01)

(52) U.S. Cl.
USPC .......................... 382/118; 382/218; 382/293

(58) Field of Classification Search
USPC .................. 382/115, 118, 218, 293
See application file for complete search history.

(56) References Cited

U.S. PATENT DOCUMENTS

| | | | |
|---|---|---|---|
| 5,003,166 A | 3/1991 | Girod | |
| 6,836,554 B1 | 12/2004 | Bolle et al. | |
| 7,120,607 B2 | 10/2006 | Bolle et al. | |
| 7,593,585 B2 * | 9/2009 | Ishida | 382/254 |
| 7,606,790 B2 * | 10/2009 | Levy | 1/1 |
| 7,646,909 B2 * | 1/2010 | Jiang et al. | 382/154 |
| 7,751,599 B2 * | 7/2010 | Chen et al. | 382/118 |
| 7,835,568 B2 * | 11/2010 | Park et al. | 382/154 |
| 7,848,548 B1 * | 12/2010 | Moon et al. | 382/118 |
| 7,848,588 B2 * | 12/2010 | Li et al. | 382/255 |
| 7,860,340 B2 * | 12/2010 | Marugame et al. | 382/274 |
| 7,876,931 B2 * | 1/2011 | Geng | 382/118 |
| 8,085,996 B2 * | 12/2011 | Ogawa | 382/118 |
| 2003/0026588 A1 | 2/2003 | Elder et al. | |
| 2004/0179719 A1 | 9/2004 | Chen et al. | |
| 2005/0286767 A1 | 12/2005 | Hager et al. | |
| 2006/0050933 A1 | 3/2006 | Adam et al. | |
| 2006/0285770 A1 | 12/2006 | Lim et al. | |
| 2007/0127787 A1 * | 6/2007 | Castleman et al. | 382/118 |
| 2009/0175508 A1 * | 7/2009 | Connell et al. | 382/118 |

FOREIGN PATENT DOCUMENTS

WO  WO2006061365  6/2006

* cited by examiner

*Primary Examiner* — Gregory M Desire
(74) *Attorney, Agent, or Firm* — Eustus D. Nelson; Ryan, Mason & Lewis, LLP

(57) ABSTRACT

Techniques for generating a distorted template for a given facial image are provided. First, at least one facial feature point from a given facial image is selected. The selected facial feature has location information associated therewith. A representation of a region proximate to the selected facial feature point is then generated. Next, the location information associated with the selected facial feature point and/or the representation of the region proximate to the selected facial feature point are distorted. A distorted template is then formed, wherein the distorted template comprises the distorted location information associated with the selected facial feature point and/or the distorted representation of the region proximate to the selected facial feature point.

17 Claims, 5 Drawing Sheets

100

500 ial image
METHODS AND APPARATUS FOR GENERATION OF CANCELABLE FACE TEMPLATE

FIELD OF THE INVENTION

The present invention generally relates to facial image processing systems and, more particularly, to techniques for generating cancelable face templates which can be used for identification purposes in such facial image processing systems.

BACKGROUND OF THE INVENTION

Identification using biometrics has become an increasingly popular form of user verification. A "biometric" is generally understood to refer to one or more intrinsic physical traits or characteristics associated with an individual (e.g., facial features, fingerprint, etc.). The increase in popularity of such a verification approach is due to the inherent advantages of biometric data. First, it is convenient for individuals and institutions because an individual no longer needs to remember passwords and/or carry unique identifiers such as photo identification cards. Biometrics are compact and individuals can easily carry their identity with them at all times. Another key advantage of using biometrics is security.

At first glance, biometric data is incredibly secure because, theoretically, no two individuals possess the same biometric signature. However, although biometric identification is undoubtedly unique and simple to use, the biometrics of an individual can also be easily compromised. Biometric forgery can be as simple as hacking into an accounts database and copying the biometric signatures of individuals. Furthermore, after obtaining a biometric signature, a forger can easily infiltrate any account secured by the biometric (e.g., banks, computers, buildings, etc.).

Many existing techniques do not address biometric theft since many assume that the uniqueness of biometric signatures alone provides sufficient security. However, as a practical issue, after the biometric of an individual has been stolen, the individual can not simply cancel the stolen biometric and establish a new one. There have been attempts to create distorted versions of a biometric for identification purposes, however, these methods can be limited. For example, some existing techniques utilize a method of distorting biometrics by warping the entire biometric. Other existing techniques utilize a method of distorting biometrics by breaking the biometric up into blocks and scrambling the blocks of the biometric.

These existing distortion approaches result in a biometric form that can not be used on current biometric scanners because the biometric no longer resembles the scanned body part. Further, the distorted biometric is so obviously altered that a biometric forger may make attempts to reverse engineer the original biometric. This is feasible since existing systems create distorted biometric forms that can revert to the original biometric. Therefore, if a forger knows that a biometric has been distorted and knows how the biometric was distorted, the forger can undo the distortion.

The method of scrambling pieces of a biometric is typically used in face biometrics. Such an existing technique creates Picasso-type face renderings that can not be used on legacy face recognition systems because the images are too abstract. It follows that such an existing technique fails to distort face biometrics in such a way that characteristics of a "natural" face are retained.

Therefore, there is a need for generating distorted face biometrics that: (1) are unique; (2) can not be used to reform the original biometric ("non-invertible"); (3) appear authentic or natural; (4) can be consistently recreated; and (5) can be easily canceled and replaced whenever the security or privacy of an individual has been compromised.

SUMMARY OF THE INVENTION

Principles of the present invention provide techniques that overcome the above-mentioned drawbacks associated with existing methods by providing techniques that address the above needs, as well as other needs. More particularly, principles of the invention provide techniques for generating a distorted template for a given facial image. The distorted template may also be referred to as a distorted face representation or a cancelable face template. Such distorted template can itself be used for identification purposes or can be used to generate a distorted facial image that can be used for identification purposes.

For example, in a first aspect of the invention, a technique for generating a distorted face representation for a given facial image is provided. First, at least one facial feature point from a given facial image is selected. The selected facial feature point has location information associated therewith. A representation is then generated of a region (e.g., a patch) proximate to the selected facial feature point. Next, the technique performs a distortion of one or both of: (i) the location information associated with the selected facial feature point; and (ii) the representation of the region proximate to the selected facial feature point. A distorted face representation is then formed. The distorted face representation comprises one or both of: (i) the distorted location information associated with the selected facial feature point; and (ii) the distorted representation of the region proximate to the selected facial feature point.

The distortion step may be performed in accordance with a distortion key. A distortion key is preferably a definition of the particular distortion transform that is applied to generate the distorted face representation. In addition, the distorted face representation is preferably non-invertible and is preferably in the form of a template.

Further, the location information associated with the selected facial feature point may comprise a location coordinate set. If so, the step of distorting the location information associated with the selected facial feature point may further comprise altering the location coordinate set associated with the selected facial feature point.

Still further, the representation of the region proximate to the selected facial feature point may comprise a feature vector. If so, the step of distorting the representation of the region proximate to the selected facial feature point may further comprise altering the feature vector.

In accordance with one embodiment of the invention, the distorted face representation may be subsequently useable for an identity verification operation. Alternatively, the distorted face representation may be subsequently useable to generate a distorted version of the given facial image. The distorted version of the given facial image will thus advantageously comprise facial features that maintain a natural appearance. The distorted version of the given facial image may then be subsequently useable for an identity verification operation.

In a second aspect of the invention, an article of manufacture for generating a distorted face representation for a given facial image comprises a computer readable storage medium containing one or more programs which when executed by a computer implement the above steps.

In a third aspect of the invention, an apparatus for generating a distorted face representation for a given facial image comprises: a memory; and at least one processor coupled to the memory and operative to: (i) select at least one facial feature point from the given facial image, the selected facial feature point having location information associated therewith; (ii) generate at least one representation of a region proximate to the selected facial feature point; (iii) distort at least one of: (a) the location information associated with the selected facial feature point; and (b) the representation of the region proximate to the selected facial feature point; and (iv) form a distorted face representation comprising at least one of: (a) the distorted location information associated with the selected facial feature point; and (b) the distorted representation of the region proximate to the selected facial feature point.

In a fourth aspect of the invention, a system for generating a distorted face representation for a given facial image is provided. The system comprises a feature locator for selecting at least one facial feature point from the given facial image, the selected facial feature point having location information associated therewith. The system further comprises a feature summarizer for generating at least one representation of a region proximate to the selected facial feature point. Further, the system comprises a distorter for distorting at least one of: (i) the location information associated with the selected facial feature point; and (ii) the representation of the region proximate to the selected facial feature point. Also, the system may comprise a distorted face representation generator for forming a distorted face representation comprising at least one of: (i) the distorted location information associated with the selected facial feature point; and (ii) the distorted representation of the region proximate to the selected facial feature point. In an additional embodiment, the feature distorter performs a distortion in accordance with a distortion key.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

Principles of the invention will be illustrated below in the context of the distortion of certain facial features. However, it is to be understood that the techniques for generating a distorted template for a given facial image according to the invention may be applied to any facial feature such that a cancelable template can be produced.

The term "cancelable" as used herein is intended to be construed broadly so as to encompass, by way of example and without limitation, anything that can be deleted and replaced.

The term "distorted template" as used herein is intended to be construed broadly so as to encompass, by way of example and without limitation, a set of values that represent a distortion. A distorted template may also be referred to herein as a "distorted face representation" or a "cancelable face template."

The term "distorted subset" as used herein is intended to be construed broadly so as to encompass, by way of example and without limitation, a set of values altered from their original values by a distortion, wherein the distorted subset may comprise at least a part of the distorted template.

The term "distortion key" as used herein is intended to be construed broadly so as to encompass, by way of example and without limitation, a definition of the particular distortion transform that is applied to generate the distorted template.

The term "feature vector" as used herein is intended to be construed broadly so as to encompass, by way of example and without limitation, a vector that represents a part of or a whole feature, e.g., a facial feature.

The term "location information" as used herein is intended to be construed broadly so as to encompass, by way of example and without limitation, any data that defines location.

The term "non-invertible" as used herein is intended to be construed broadly so as to encompass, by way of example and without limitation, anything incapable of being changed to (reverted to) its original form.

The term "patch" as used herein is intended to be construed broadly so as to encompass, by way of example and without limitation, a smaller region of a larger area.

Figure 1:
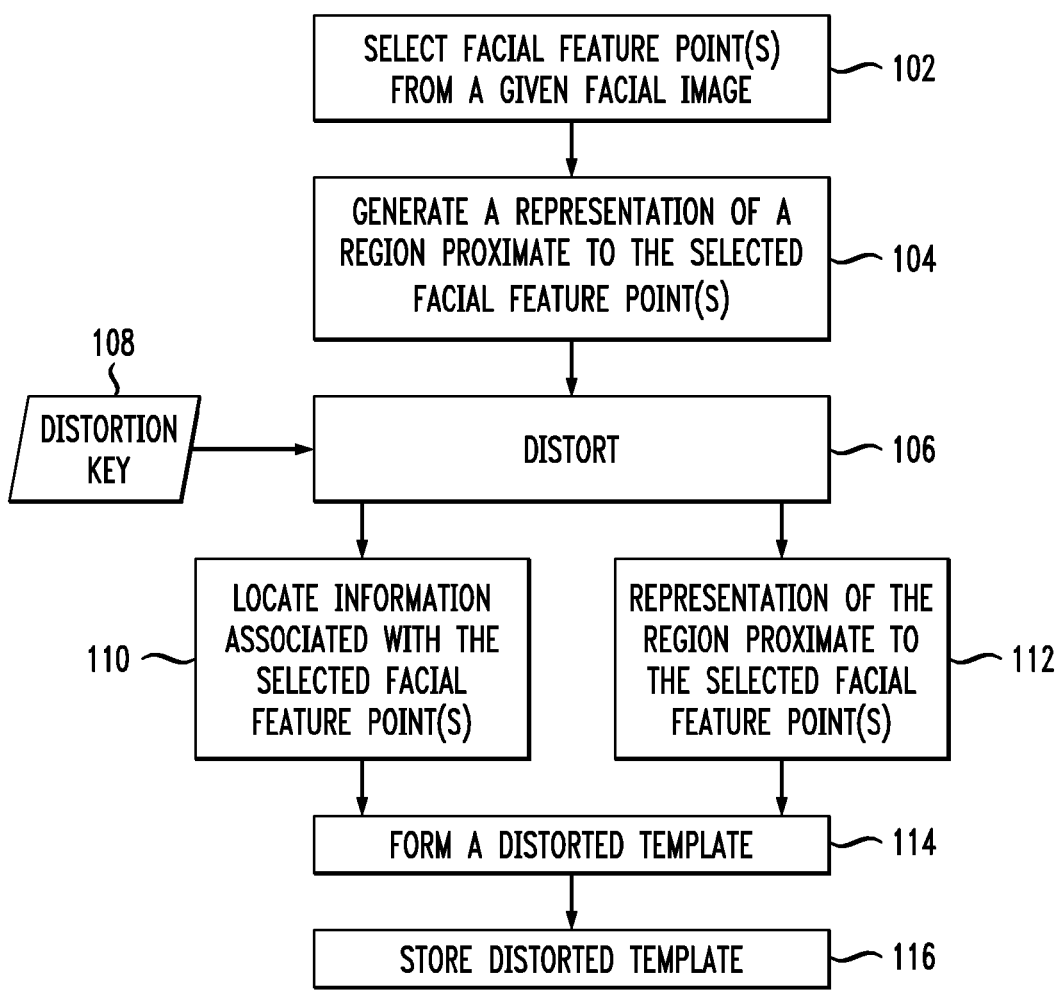
FIG. 1 is a flow diagram illustrating a methodology for generating a distorted template for a given facial image, according to an embodiment of the present invention.

Referring initially to FIG. 1, a flow diagram illustrates methodology 100 for generating a distorted template for a given facial image, according to an embodiment of the present invention.

First, one or more points associated with a facial feature of a given facial image are selected (step 102). It is to be understood that more than one facial feature may be selected and processed in accordance with methodology 100. In an illustrative embodiment, the face is analyzed and location information for each selected facial feature point is obtained. This process may, by way of example only, include using light gradients, Moravec points or Scale-Invariant Feature Transform (SIFT) centers. The location information may include location coordinates (e.g., in a two-dimensional coordinate system, an x-component and a y-component) for facial feature points such as, for example, points associated with the mouth, eyes, nose, ears, etc. That is, for each selected point of interest (e.g., one or more points associated with a corner of a mouth, an inner aspect of an eye, a tip of a nose, etc.), an (x, y) coordinate is determined.

After locating the one or more selected facial feature points, a representation of a region proximate (i.e., near) to each selected facial feature point is generated (step 104). This region may be referred to as a patch. In one illustrative embodiment, a patch representation is in the form of a feature vector which includes a set of feature vector values. The feature vector is preferably a low-dimensional feature vector, i.e., typically a vector with fewer elements then there are pixels in the patch. Each feature vector value represents a portion of the patch representation. The feature vector values may be, by way of example only, discrete cosine transform (DCT) coefficients or other projection coefficients such as Gabor expansions. In an additional embodiment, the feature vector values may be references to predefined patch image prototypes. Feature vectors simplify the distortion process because portions of a patch representation may be altered simply by adding, deleting, or substituting feature vector values.

Locating facial feature points and generating patch representations set the stage for distortion operations 106. In an illustrative embodiment, the distortion is performed with a distortion key 108. As explained above, the distortion key represents a definition of the particular distortion transform that is applied to generate the distorted template. Such a distortion transform may be predetermined by a system designer or adapted in real-time by a system administrator.

The first part of distortion step 106 is geometric, wherein the location information of the one or more selected facial feature points is changed (step 110). As specified by distortion key 108, adjusting the x-axis component, the y-axis component, or both, of the referential location coordinates associated with the selected facial feature points results in distorting the facial feature. This may include moving the eyes farther apart or closer together, making the nose longer or shorter, making the mouth wider or narrower, making the chin smaller or larger, etc.

In an illustrative embodiment, the geometric distortion is not arbitrary; rather, the distortion complies with average face parameters. The average face parameters are the average parameters of facial features according to a pool of face images. The pool of face images may be specific to a geographic area or a select group of persons. The purpose of obtaining average face parameters is to prevent unrealistic or unnatural distortions. For example, existing facial biometric techniques scramble blocks of the face images or warp the entire face image, which results in a Picasso-type or other unnatural rendering. Such unrealistic distortions typically can not be used in legacy face recognition systems. In an illustrative embodiment, methodology 100 generates a distorted subset that can subsequently be used to create a natural-looking, distorted face image, which can thus be used in legacy face recognition systems.

The second part of the distortion relates to the patch representation of each selected facial feature points, wherein the representation of the region proximate to the selected facial feature point is distorted (step 112). Again, the specific distortion is defined by distortion key 108. In one example, the distortion may be the subtle addition of an upward curve on the edge of a lip or an eye.

In an illustrative embodiment, the patch representation of the selected facial feature point is distorted by changing one or more values of the feature vector. The values used for patch distortion preferably also comply with average face parameters to maintain a natural appearance.

For example, if each patch representation is considered as a point in a high-dimensional space (equal to the length of the vector), each representation can be altered by adding a random (but repeatable) offset thereto. Again, care must be taken to stay within the manifold of observed human-like points otherwise a patch describing, say, an eye corner could be transformed to something like the letter A, which would be noticeable.

Furthermore, location information and feature vector values of the patch representations (i.e., portions thereof) may be deleted or replaced with "generic" location information and feature vector values, respectively. The generic location information and feature vector values may be average parameters statistically calculated from a pool of face images. The purpose of deleting and replacing values is to make the final distortion non-invertible, wherein the distortion cannot be used to regenerate the original facial image since the original information has been erased.

Still further, to make the second portion of the transform strictly non-invertible, a form of dimensionality-reduction could be applied. A random (but repeatable) selection of the vector values is effectively removed. This can either be a straight reduction (to make the length of the representation vector shorter) or the substitution of some other value. A preferred method is to set a selection of the values to the mean value observed across a wide range of individuals. This helps ensure that the patch still looks like something appropriate for its location. The alteration is non-invertible since once the value is replaced (or deleted), it is not possible to accurately guess what its value originally was (assuming low correlation to other parts of the representation such as with an orthonormal vector basis set).

The overall cancelable transform (distortion key) would describe how to deform the point mesh (set of selected facial feature points) and alter each of the associated patch representations. Different sets of point displacements and description vector perturbations could be devised to generate multiple different transforms for the same individual. The required registration of points (making up the facial features), needed for repeatability, can be predetermined by a front-end feature extraction system. It may be assumed that the point that corresponds to the left eye is always known and that there are, for example, 27 distinguishable points in a facial image. It may also be assumed that the patch characteristics are also preferably fixed size vectors with coefficients in a known order, so they are also "registered" in a repeatable way.

Returning now to FIG. 1, as shown, after the distortion process completes, a distorted template is formed (step 114). The distorted template comprises the distorted location information (adjusted location coordinate set) and the distorted patch representation (adjusted feature vector) for each selected facial feature point. The newly formed distorted template is then stored (step 116).

Note that, in one embodiment, the distorted template can be comprised only of the set of distorted data (i.e., distorted subset) that represents the distorted feature point locations and corresponding distorted patch representations. However, since the distorted template would therefore not contain much information that is unique to the individual whose facial image is being distorted, in a preferred embodiment, the distorted template comprises the set of distorted data and a set of undistorted data that represents feature point locations and patch representations of a given facial image that have not been altered via methodology 100. Thus, in such a preferred embodiment, the template includes location coordinates and feature vectors for all 27 facial feature points (distorted or not) used to define a facial image. Of course, the number of facial feature points depends on the facial recognition system being employed.

Thus, one could refer to an "original template" as a template that included location coordinates and feature vectors for all 27 facial feature points used to define a facial image, before application of methodology 100. Thus, given an original template, methodology 100 generates a distorted template.

It is to be appreciated that while a preferred embodiment includes distorting both facial feature location coordinates and feature vectors associated with given patches, in alternative embodiments of the invention, one or the other type of distortion, alone, may be performed such that the distorted template contains only one type of distorted information.

At the end of the methodology, the distorted template can be used directly for matching as it still retains most of the distinctiveness of the original representation.

However, a given legacy face recognition system may have its own proprietary undisclosed data format so that finding points and distorting them may be problematic. In this case, an independent feature localization and analysis system could be used to generate a suitable known representation to apply the transform to. This transformed representation could then be "rendered" back into image space to generate a face-like image.

That is, the methodology breaks the face into feature patches, non-invertibly distorts these patches, and then reassembles them into an image. This is generally done by recreating a small patch of pixels from the distorted description vector, placing this patch at the (distorted) feature location, and then smoothing/interpolating as needed to make sure there are no obvious blocking artifacts or discontinuities, i.e., to give the whole image a plausible face reconstruction. This altered face would then be submitted to the legacy system and be processed as usual by whatever method that vendor happens to use.

Figure 2:
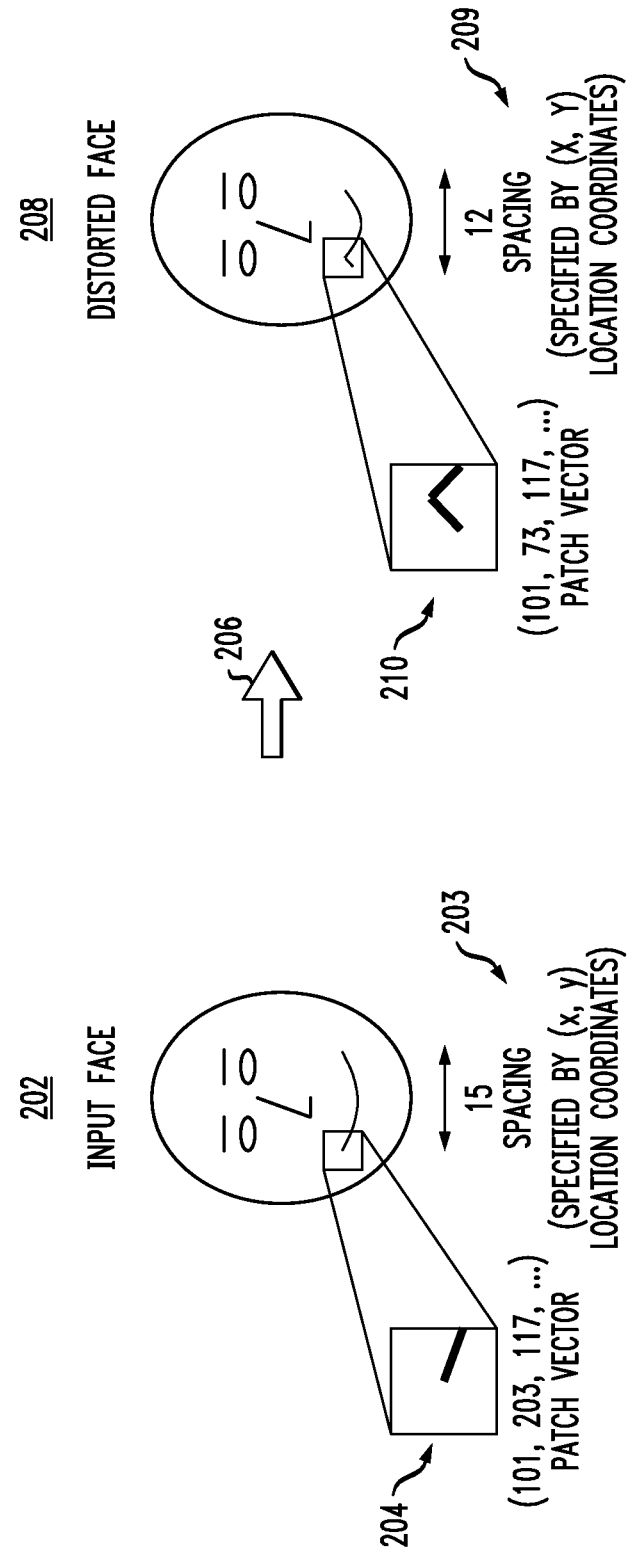
FIG. 2 is a diagram illustrating the methodology of FIG. 1 as applied to a given example, according to an embodiment of the present invention.

Referring now to FIG. 2, a diagram illustrates the methodology of FIG. 1 as applied to a given example. Input facial image 202 illustrates a mouth with a spacing of 15 units. It is understood that the spacing is set by the location (x, y coordinates) of the points that make up the mouth. Further, patch 204 on the edge of the mouth shows an upward slant defined by feature vector values (101, 203, 117, ...). Distortion 206 of the input facial image (performed in accordance with the inventive methodologies described herein) is shown by distorted facial image 208.

First, the mouth has been narrowed to have a spacing of 12 units. This is a distortion of the location information associated with the mouth. In this example, this is accomplished by altering the location coordinate sets of feature points associated with the mouth.

Next, the patch at the edge of the mouth is distorted to include a downward slant. In this example, the distortion of the patch is created by altering the values of the feature vector. The distorted feature vector is defined by values (101, 73, 117, ...). Note that for this distortion transform, the distortion key would specify that the second value in the subject feature vector be offset by a value of 130 (i.e., 203−130=73).

Figure 3:
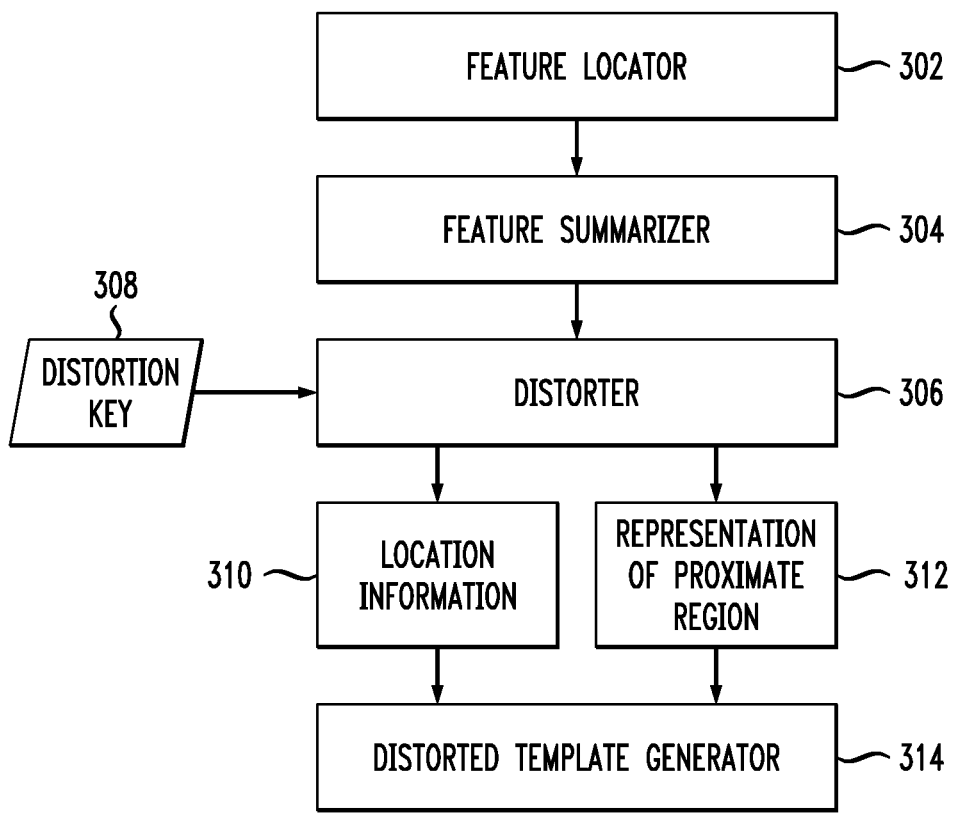
FIG. 3 is a flow diagram illustrating a system for generating a distorted template for a given facial image, according to an embodiment of the present invention.

Referring now to FIG. 3, a flow diagram illustrates a system for generating a distorted template for a given facial image, according to an embodiment of the present invention. The components of system 300 carry out the methods illustrated in FIG. 1. System 300 begins at feature locator 302. The feature locator carries out step 102 of FIG. 1. At least one facial feature point from a given facial image is selected. Each selected facial feature point has associated location information. Next, the feature summarizer 304 carries out step 104 of FIG. 1. For each selected facial feature point, the feature summarizer generates patch representations of the regions surrounding each corresponding facial feature point.

After summarizing the facial feature points, distorter 306 carries out steps 106, 110, and 112 of FIG. 1. The distorter, using a distortion key 308, distorts the location information associated with each selected facial feature point (310) and/or the patch representations (312). After the distortion, the distorted template generator 314 carries out steps 114 and 116 of FIG. 1. The distorted template generator forms a distorted template comprising the distorted location information and/or the distorted patch representations.

Figure 4:
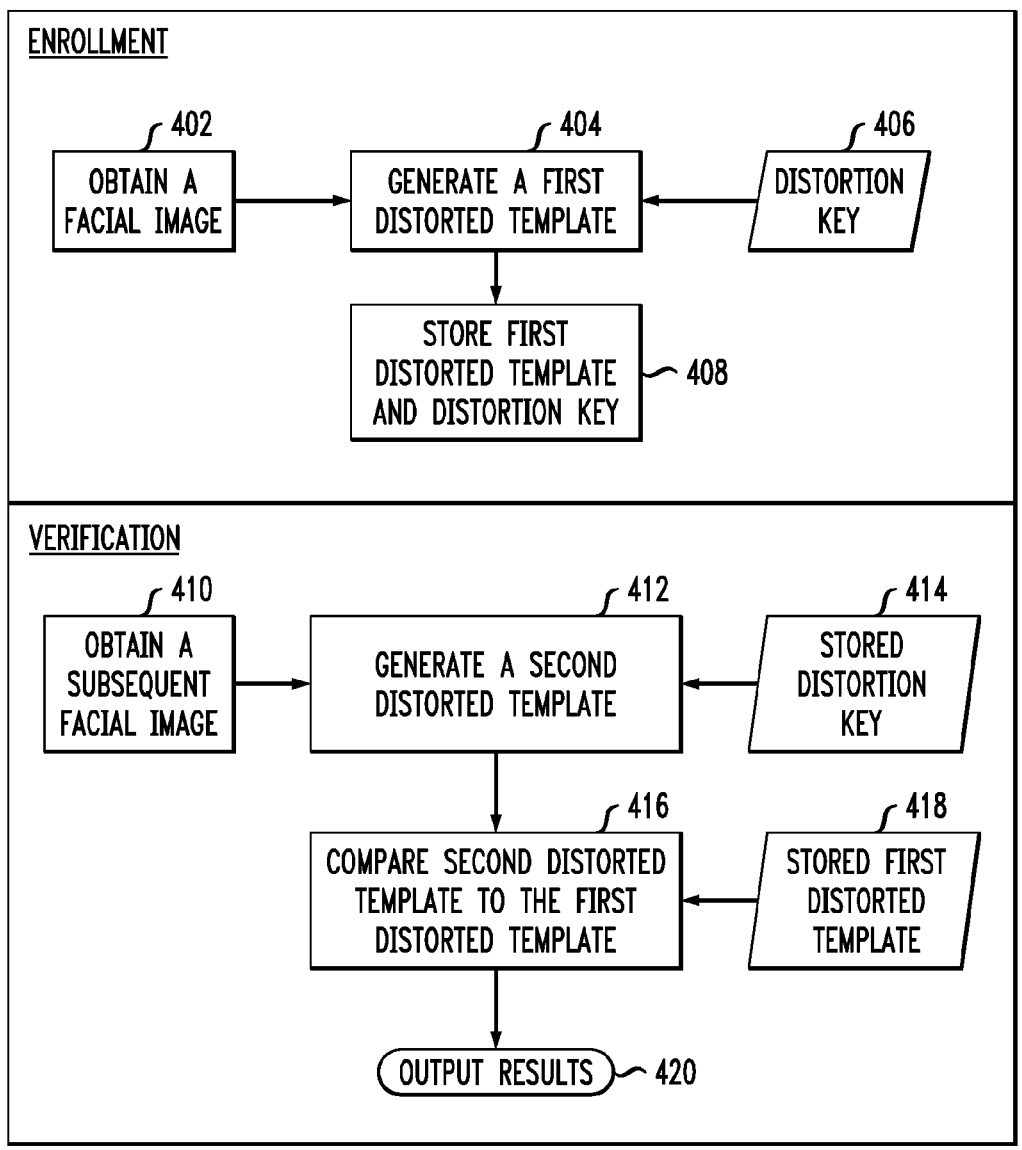
FIG. 4 is a flow diagram illustrating a methodology for enrollment and verification of a facial image, according to an embodiment of the present invention.

Referring now to FIG. 4, a flow diagram illustrates a methodology for enrollment and verification of a facial image, according to an embodiment of the present invention. Methodology 400 exemplifies a two step process which includes an enrollment step and a verification step. Each step separately applies the methodology of FIG. 1. The methodology begins in block 402 where a facial image is obtained for enrollment purposes. For example, a bank may enroll the faces of its customers for accounts access or an office building may enroll the faces of its employees for building access, etc. The obtained facial image is used to generate a first distorted template 404.

In an illustrative embodiment, the generation of a first distorted template requires the use of a distortion key 406, which defines a unique distortion transform. The distortion transform is used to distort the location information and/or the patch representations. The generated distorted template will be a unique product of the obtained facial image and distortion key. Multiple distortions of the same facial image will never be the same as long as different distortion keys are used for each distortion.

After generating a first distorted template, the first distorted template and distortion key are stored 408. The first distorted template and the distortion key may be stored together or separately for security purposes. For instance, an individual may want to carry the distortion key on a magnetic card or other device to prevent simultaneous theft of both the distorted template and the distortion key. However, this is unnecessary in many, if not in all cases because the generated distorted template is non-invertible, therefore, the original facial image can not be reverse engineered with the distorted template and distortion key. In an illustrative embodiment, the distorted template is made non-invertible by application of the distortion key during the distortion process.

After the enrollment of a facial image, the first distorted template is used for future verifications of identity. The verification methodology begins at block 410 where a subsequent facial image is obtained. The subsequent facial image is distorted to generate a second distorted template 412. The stored distortion key 414 used to create the first distorted template, is used to generate the second distorted template. This is to ensure that the same distortion is generated since every distortion is specific to its distortion key and facial image. After the subsequent facial image is distorted, the second distorted template is compared 416 to the first distorted template 418 generated in the enrollment process. The results of the comparison are then outputted 420. If there is a substantial enough match, then system 400 indicates that the individual in the first facial image is the individual in the second facial image (i.e., the individual that provided the second facial image is verified).

Figure 5:
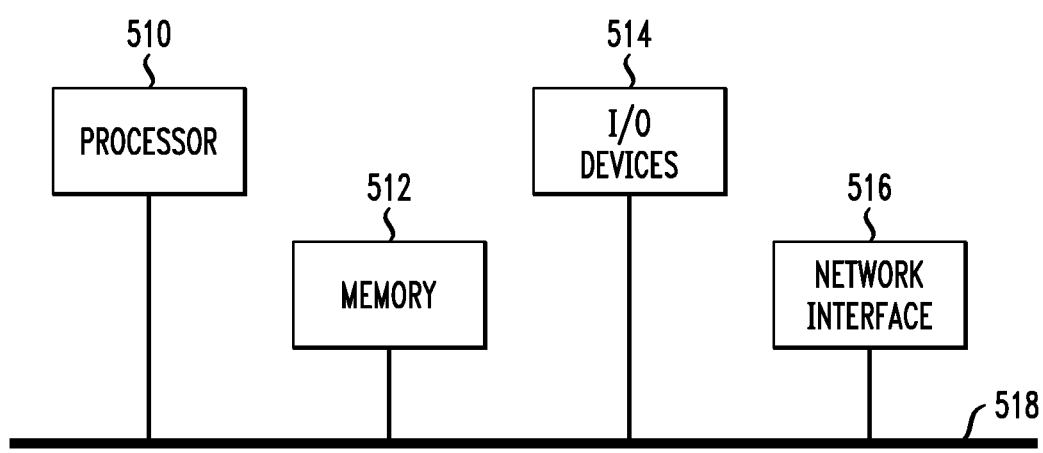
FIG. 5 is a diagram illustrating an illustrative hardware implementation of a computing system in accordance with which one or more components/methodologies of the present invention may be implemented, according to an embodiment of the present invention.

Referring now to FIG. 5, block diagram 500 illustrates an exemplary hardware implementation of a computing system in accordance with which one or more components/methodologies of the invention (e.g., components/methodologies described in the context of FIGS. 1-4) may be implemented, according to an embodiment of the present invention.

As shown, the techniques for generating a distorted template for a given facial image may be implemented in accordance with a processor 510, a memory 512, I/O devices 514, and a network interface 516, coupled via a computer bus 518 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for generating a distorted face representation for a given facial image, comprising the steps of:
   selecting at least one facial feature point from the given facial image, the selected facial feature point having location information associated therewith;
   generating at least one representation of a region proximate to the selected facial feature point;
   using a distortion key to distort both the location information associated with the selected facial feature point, and the representation of the region proximate to the selected facial feature point;
   forming a distorted face template comprising the distorted location information associated with the selected facial feature point, and the distorted representation of the region proximate to the selected facial feature point; and
   storing the distorted face template in association with the distortion key,
   wherein one or more of the steps of selecting, generating, distorting and forming are performed by a computer.

2. The method of claim 1, wherein the location information associated with the selected facial feature point comprises a location coordinate set.

3. The method of claim 2, wherein the step of distorting the location information associated with the selected facial feature point further comprises altering the location coordinate set associated with the selected facial feature point.

4. The method of claim 1, wherein the representation of the region proximate to the selected facial feature point comprises a feature vector.

5. The method of claim 4, wherein the step of distorting the representation of the region proximate to the selected facial feature point further comprises altering the feature vector.

6. The method of claim 1, wherein the distorted face template is non-invertible.

7. The method of claim 1, wherein the distorted face template is subsequently useable for an identity verification operation.

8. The method of claim 1, wherein the distorted face template is subsequently useable to generate a distorted version of the given facial image.

9. The method of claim 8, wherein the distorted version of the given facial image comprises facial features that maintain a natural appearance.

10. The method of claim 8, wherein the distorted version of the given facial image is subsequently useable for an identity verification operation, wherein an identity verification operation comprises comparing the distorted version of the given facial image with the distorted face template stored in association with the distortion key to verify an identity of the individual.

11. An article of manufacture for generating a distorted face representation for a given facial image, the article of manufacture comprising a computer readable storage medium containing one or more programs which when executed by a computer implement the steps of claim 1.

12. A system for generating a distorted face representation for a given facial image, comprising:
    a memory for storing program instructions for generating a distorted face representation for a given facial image; and
    a processor to execute the program instructions to instantiate:
       a feature locator for selecting at least one facial feature point from the given facial image, the selected facial feature point having location information associated therewith;
       a feature summarizer for generating at least one representation of a region proximate to the selected facial feature point;
       a distorter for using a distortion key to distort both the location information associated with the selected facial feature point, and the representation of the region proximate to the selected facial feature point; and
       a distorted face template generator for forming a distorted face template comprising the distorted location information associated with the selected facial feature point, and the distorted representation of the region proximate to the selected facial feature point,
    wherein the distorted face template is stored in the memory in association with the distortion key.

13. The system of claim 12, wherein the location information associated with the selected facial feature point comprises a location coordinate set.

14. The system of claim 12, wherein the representation of the region proximate to the selected facial feature point comprises a feature vector.

15. The system of claim 12, wherein the distorted face template is subsequently useable for an identity verification operation.

16. The system of claim 12, wherein the distorted face template is subsequently useable to generate a distorted version of the given facial image.

17. An apparatus for generating a distorted face representation for a given facial image, the apparatus comprising:
    a memory; and
    at least one processor coupled to the memory and operative to:
       select at least one facial feature point from the given facial image, the selected facial feature point having location information associated therewith;

generate at least one representation of a region proximate to the selected facial feature point;

using a distortion key to distort both the location information associated with the selected facial feature point, and the representation of the region proximate to the selected facial feature point;

form a distorted face template comprising the distorted location information associated with the selected facial feature point, and the distorted representation of the region proximate to the selected facial feature point; and storing the distorted face template in association with the distortion key.

* * * * *